US010942760B2

(12) United States Patent
Fontoura et al.

(10) Patent No.: US 10,942,760 B2
(45) Date of Patent: *Mar. 9, 2021

(54) PREDICTIVE RIGHTSIZING FOR VIRTUAL MACHINES IN CLOUD COMPUTING SYSTEMS

(71) Applicant: MICROSOFT TECHNOLOGY LICENSING, LLC, Redmond, WA (US)

(72) Inventors: Marcus Felipe Fontoura, Redmond, WA (US); Ricardo Gouvea Bianchini, Redmond, WA (US); Girish Bablani, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,414

(22) Filed: Aug. 28, 2018

(65) Prior Publication Data

US 2019/0163517 A1  May 30, 2019

Related U.S. Application Data

(63) Continuation-in-part of application No. 15/424,305, filed on Feb. 3, 2017, now Pat. No. 10,296,367.
(Continued)

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS 8,504,689 B2  8/2013  Ferris et al.
8,788,855 B2  7/2014  Cong et al.
(Continued)

FOREIGN PATENT DOCUMENTS

WO  2014047073 A1  3/2014
WO  2015027865 A1  3/2015

OTHER PUBLICATIONS

"Data Centers in the Wild: A large Performance Study", Research Report Published in RZ3820, Apr. 2012, 13 Pages.
(Continued)

*Primary Examiner* — Charles M Swift
(74) *Attorney, Agent, or Firm* — Shook, Hardy & Bacon L.L.P.

(57) ABSTRACT

Various embodiments, methods, and systems for implementing a predictive rightsizing system are provided. Predicted rightsized deployment configurations are generated for virtual machine "VM" deployments having deployment configurations that are modified to predicted rightsized deployment configurations based on a prediction engine. In operation, a VM deployment, associated with a request to deploy one or more VMs on a node, is accessed at a predictive rightsizing controller. A predicted resource utilization for the VM deployment is generated at the prediction engine and accessed at the predictive rightsizing controller. The predicted resource utilization is generated based on a prediction engine that uses past behaviors and features associated with previous VM deployments. Based on the predicted resource utilization, a predicted rightsized deploy-
(Continued)

US 10,942,760 B2

Page 2 ment configuration is generated for the VM deployment. The predicted rightsized deployment configuration is communicated such that the request to deploy the VMs is executed based on the predicted rightsized deployment configuration.

20 Claims, 9 Drawing Sheets

Related U.S. Application Data

(60) Provisional application No. 62/587,194, filed on Nov. 16, 2017.

(51) Int. Cl.
*G06F 9/50* (2006.01)
*G06N 20/00* (2019.01)
*G06N 5/04* (2006.01)

(52) U.S. Cl.
CPC .............. *G06F 9/48* (2013.01); *G06F 9/485* (2013.01); *G06F 9/4843* (2013.01); *G06F 9/4856* (2013.01); *G06F 9/4881* (2013.01); *G06F 9/50* (2013.01); *G06F 9/505* (2013.01); *G06F 9/5005* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *G06F 9/5077* (2013.01); *G06F 9/5083* (2013.01); *G06F 9/5088* (2013.01); *G06N 5/04* (2013.01); *G06N 20/00* (2019.01); *G06F 2009/4557* (2013.01); *G06F 2009/45575* (2013.01); *G06F 2009/45583* (2013.01)

(58) Field of Classification Search
CPC ............. G06F 2009/45575; G06F 9/48; G06F 9/4843; G06F 9/485; G06F 9/4856; G06F 9/4881; G06F 9/50; G06F 9/5005; G06F 9/5011; G06F 9/5016; G06F 9/5022; G06F 9/5027; G06F 9/5044; G06F 9/505; G06F 9/5055; G06F 9/5083; G06F 9/5088
See application file for complete search history.

(56) References Cited

U.S. PATENT DOCUMENTS

| | | | |
|---|---|---|---|
| 8,826,277 B2 | 9/2014 | Chang et al. | |
| 8,832,239 B2 | 9/2014 | Assuncao et al. | |
| 8,881,142 B1 | 11/2014 | Reid et al. | |
| 8,903,983 B2 | 12/2014 | Bakman et al. | |
| 8,930,948 B2 | 1/2015 | Shanmuganathan et al. | |
| 9,298,443 B2 | 3/2016 | Dias de Assuncao et al. | |
| 9,465,630 B1 | 10/2016 | Muniz et al. | |
| 9,471,394 B2 | 10/2016 | Perlegos et al. | |
| 9,672,054 B1* | 6/2017 | Gupta | G06F 9/45533 |
| 2002/0194251 A1 | 12/2002 | Richter et al. | |
| 2007/0271560 A1 | 11/2007 | Wahlert et al. | |
| 2010/0058342 A1 | 3/2010 | Machida | |
| 2010/0199285 A1* | 8/2010 | Medovich | G06F 9/45533 718/104 |
| 2010/0242045 A1 | 9/2010 | Swamy et al. | |
| 2011/0072138 A1 | 3/2011 | Canturk et al. | |
| 2011/0099548 A1 | 4/2011 | Shen et al. | |
| 2011/0154320 A1 | 6/2011 | Verma | |
| 2011/0276981 A1 | 11/2011 | Clohessy et al. | |
| 2012/0131594 A1 | 5/2012 | Morgan | |
| 2012/0137002 A1 | 5/2012 | Ferris et al. | |
| 2012/0198447 A1* | 8/2012 | Osogami | G06F 9/5066 718/1 |
| 2012/0304191 A1 | 11/2012 | Morgan | |
| 2012/0324444 A1 | 12/2012 | Gulati et al. | |
| 2013/0097601 A1 | 4/2013 | Podvratnik et al. | |
| 2014/0032761 A1 | 1/2014 | Beveridge | |
| 2014/0215076 A1 | 7/2014 | Grothues | |
| 2014/0359091 A1 | 12/2014 | Senniappan et al. | |
| 2014/0373010 A1 | 12/2014 | Folco et al. | |
| 2015/0039764 A1 | 2/2015 | Beloglazov et al. | |
| 2015/0143364 A1 | 5/2015 | Anderson et al. | |
| 2015/0178019 A1 | 6/2015 | Hegdal et al. | |
| 2015/0234674 A1 | 8/2015 | Zhong | |
| 2015/0242234 A1 | 8/2015 | Harris et al. | |
| 2015/0317081 A1 | 11/2015 | Singh et al. | |
| 2015/0355923 A1 | 12/2015 | Keller | |
| 2015/0365349 A1 | 12/2015 | Verma | |
| 2016/0055025 A1* | 2/2016 | Jul | G06F 9/45558 718/1 |
| 2016/0070602 A1 | 3/2016 | Shimogawa | |
| 2016/0094410 A1 | 3/2016 | Anwar et al. | |
| 2016/0103699 A1 | 4/2016 | Thakkar et al. | |
| 2016/0162308 A1 | 6/2016 | Chen et al. | |
| 2016/0205039 A1 | 7/2016 | Akolkar et al. | |
| 2016/0378519 A1 | 12/2016 | Gaurav et al. | |
| 2017/0139742 A1* | 5/2017 | Cropper | G06F 9/45558 |
| 2017/0185438 A1 | 6/2017 | Thomas et al. | |
| 2017/0308393 A1 | 10/2017 | Chen et al. | |
| 2018/0225137 A1 | 8/2018 | Bianchini et al. | |
| 2018/0225149 A1 | 8/2018 | Bianchini et al. | |
| 2019/0205157 A1 | 7/2019 | Bianchini et al. | |

OTHER PUBLICATIONS

"Non Final Office Action Issued in U.S. Appl. No. 15/424,305", dated Oct. 3, 2018, 21 Pages.

"Notice of allowance issued in U.S Appl. No. 15/424,305", dated Nov. 28, 2018, 8 Pages.

"Non Final Office Action Issued in U.S. Appl. No. 15/424,321", dated Jul. 30, 2018, 20 Pages.

"International Search Report and Written Opinion for PCT Patent Application No. PCT/US18/015809", dated Sep. 26, 2018, 29 Pages.

"International Search Report and Written Opinion for PCT Patent Application No. PCT/US18/015813", dated Aug. 14, 2018, 22 Pages.

Saddar, et al., "Future Load Prediction of Virtual Machines in Cloud Computing Environment", In International Journal of Advanced Computer Technology, Jan. 2014, 4 pages.

"International Search Report and Written Opinion Issued in PCT Application No. PCT/US18/059913", dated Feb. 25, 2019, 12 Pages.

"Non-Final Office Action Issued in U.S. Appl. No. 16/297,530", dated Jul. 15, 2020, 19 Pages.

"Notice of Allowance Issued in U.S. Appl. No. 16/297,530", dated Nov. 18, 2020, 9 Pages.

Urgaonkar, et al., "Resource Overbooking and Application Profiling in Shared Hosting Platforms", in 5th Symposium on Operating Systems Design and Implementation, vol. 36, Issue SI, Dec. 31, 2002, pp. 239-254.

Ying, Liu, "Sponge: An Oversubscription Strategy Supporting Performance Interference Management in Cloud", in Journal of China Communications, vol. 12, Issue 11, Nov. 2015, pp. 196-209.

Office Action Issued in European Patent Application No. 18705760. 9, dated Jan. 12, 2021, 10 Pages.

* cited by examiner

Type G: Extreme Perf., SSD

| Type | Cores | Ram |
|---|---|---|
| G1 | 2 | 28 |
| G2 | 4 | 56 |
| G3 | 8 | 112 |
| G4 | 16 | 224 |
| G5 | 32 | 448 |

Type D: Low-latency, SSD

| Type | Cores | Ram |
|---|---|---|
| D1 | 1 | 3.5 |
| D2 | 4 | 7 |
| D3 | 4 | 14 |
| D4 | 8 | 28 |
| D11 | 2 | 14 |
| D12 | 4 | 28 |
| D13 | 8 | 56 |
| D14 | 16 | 112 |

Type A: High-value

| Type | Cores | Ram |
|---|---|---|
| A0 | 1 | .768 |
| A1 | 1 | 1.75 |
| A2 | 2 | 3.5 |
| A3 | 4 | 7 |
| A4 | 8 | 14 |
| A5 | 2 | 14 |
| A6 | 4 | 28 |
| A7 | 8 | 56 |
| A8 | 8 | 56 |
| A9 | 16 | 112 |
| A10 | 8 | 56 |
| A11 | 16 | 112 |

PREDICTIVE RIGHTSIZING FOR VIRTUAL MACHINES IN CLOUD COMPUTING SYSTEMS

CROSS-REFERENCE TO RELATED APPLICATIONS

This application is a continuation-in-part of, and claims priority to U.S. patent application Ser. No. 15/424,305, filed Feb. 3, 2017, entitled "RESOURCE MANAGEMENT FOR VIRTUAL MACHINES IN CLOUD COMPUTING SYSTEMS" which is incorporated herein by reference in its entirety. This application also claims priority to U.S. Provisional Application Ser. No. 62/587,194, filed Nov. 16, 2017, entitled "PREDICTIVE RIGHTSIZING FOR VIRTUAL MACHINES IN CLOUD COMPUTING" which is incorporated herein by reference in its entirety.

FIELD

The present disclosure relates generally to cloud computing systems and more particularly to resource management for virtual machines in cloud computing systems.

BACKGROUND

Users rely on applications and services to perform various computing tasks. Cloud computing systems may offer building, deployment and management functionality for different types of applications and services. Cloud computing system providers may implement virtual systems (e.g., virtual machines "VMs") to maximize resource usage. Virtualization can support sharing and managing hardware, allowing for multiple environments which are isolated from one another, yet exist on the same physical machine. Effective resource management of cloud computing systems, including virtual systems, can be challenging. For example, individual VMs are supposed to have the right levels of central processing, memory and disk space. However, resources allocated to VMs may at times be under-utilized, which results in inefficiency.

SUMMARY

Embodiments of the present invention relate to methods, systems and computer storage media for providing predicted rightsized deployment configurations using a predictive rightsizing system. In particular, predicted rightsized deployment configurations are generated for virtual machine "VM" subscriptions having deployment configurations that are modified to predicted rightsized deployment configurations based on a prediction engine of a resource manager. The prediction engine may use a machine learning model based on past behaviors and features associated with previous VM deployments to make resource utilization predictions (e.g., maximum resource utilization predictions) for VM deployments.

In operation, at a high level, a predictive rightsizing controller can communicate to a resource manager VM deployment. The VM deployment is associated with a request to deploy one or more VMs on one or more nodes of a cloud computing system. The resource manager has a prediction engine that operates to predict resource utilizations for VM deployments based on past behaviors and features of previous VM deployments. The prediction engine generates a predicted resource utilization for the VM deployment. The predicted resource utilization can specifically be a predicted maximum resource utilization of the VM deployment. The predictive rightsizing controller receives the predicted resource utilization. Based on the predicted resource utilization, the predictive rightsizing controller generates a predicted rightsized deployment configuration for the VM deployment. The predicted rightsized deployment configuration is communicated such that the request to deploy one or more VMs can be executed based on the predicted rightsized deployment configuration.

In embodiments, the predicted resource utilization is associated with a confidence score for the predictions ("confidence score"). The confidence score can be associated with a confidence score threshold. The confidence score and the confidence score threshold can be used to determine whether to generate or recommend deploying the predicted rightsized deployment configuration of the VM deployment. Further, a customer may choose to opt-in to automatically execute the request to deploy the VM deployment based on the predicted rightsized deployment configuration, while another customer may simply have the predicted rightsized deployment configuration communicated to them via an interface.

Further areas of applicability of the present disclosure will become apparent from the detailed description, the claims and the drawings. The detailed description and specific examples are intended for purposes of illustration only and are not intended to limit the scope of the disclosure.

DESCRIPTION

Cloud computing system providers often rely on resource management tools to support efficient utilization of cloud computing system resources. The efficiency of VM allocation and resource management in the cloud computing system can be significantly improved if accurate predictions are available about future VM behaviors. Historical data about VMs can be leveraged to produce such predictions. For example, the historical data may indicate that many VM roles exhibit consistent peak CPU utilizations over time; VM roles that execute user-facing workloads consistently do so over time; tenant deployments, deployment sizes or deployment configurations are unlikely to vary widely over time; and so on. In these cases, past behaviors are reasonable predictors of future behaviors.

The resource management system (of U.S. patent application Ser. No. 15/424,305, filed Feb. 3, 2017, entitled "RESOURCE MANAGEMENT FOR VIRTUAL MACHINES IN CLOUD COMPUTING SYSTEMS," which is incorporated herein by reference in its entirety) discloses a system that learns from past behaviors and, when requested, produces predictions of future behaviors. For example, before selecting servers to run a particular VM deployment, the VM allocator can obtain from the resource management system any predictions on the potential behavior of the VMs that the VM allocator is about to allocate. With this information, the VM allocator can make a more informed set of selections.

The resource management system can further address another specific issue in cloud computing systems, VM rightsizing. VM rightsizing can generally refer to assessing and optimizing allocated VM resources. For example, CPU, memory, disk space, networking and other identified resources that are part of a VM can be monitored and changed as part of resource management to efficiently utilize resources in the cloud computing system. Rightsizing can ensure maximum performance of workloads and efficient use of underlying hardware.

Conventional rightsizing recommendations usually include rightsizing systems that monitor each virtual machine for a defined period of time (e.g., number of days) before issuing a recommended rightsize for the VM. It is common to monitor a VM for a period of time that would usually provide a comprehensive view of the lifecycle of the VM. For example, a VM can be monitored for 7, 8 or even 14 days prior to recommending a rightsize for the VM and making changes to the allocated resources of the VM. In this regard, if a customer requests a virtual machine deployment for peak performance, the rightsizing system can evaluate the VM for a period of time to understand what the peak performance behaviors are, and resource utilizations for the VM.

It may be possible that only a small percentage of virtual machines remain alive for the duration of the defined period for monitoring the VM to determine the recommended rightsized VM. It is common, for an exemplary cloud computing system, to have a significant number (e.g., 90%) of VMs last just 1 day, while a small percent (e.g., 4%) last 8 days and even smaller percent (e.g. 3%) last 14 days or more. Accordingly, the conventional model of monitoring a VM to make rightsizing recommendations for the particular VM seems flawed, in that, most VMs do not last long enough to enable a recommendation. As such, a comprehensive rightsizing system that can determine and implement recommended rightsized deployment for virtual machines while circumventing the conventional monitoring period would improve cloud computing system resource management with regard to rightsizing VMs.

Embodiments of the present invention are directed to simple and efficient methods for providing predicted rightsized deployment configurations using a predictive rightsizing system. In particular, predicted rightsized deployment configurations are generated for virtual machine "VM" deployments having deployment configurations that are modified to predicted rightsized deployment configurations based on a prediction engine of a resource manager. Based on past behaviors and features associated with previous VM deployments, the prediction engine uses a machine learning model to make resource utilization predictions (e.g., maximum resource utilization predictions) for VM deployments.

At a high level, a customer may request a VM deployment (i.e., tenant deployment). The VM deployment can include 10 A4s, where an A4 can be a type of VM having specific resource types (e.g., CPU, memory, disk, network card, etc.). The 10 A4s have a deployment configuration (i.e., identified or allocated resources for resource types of the 10 A4s). Based on receiving the request to deploy the VM deployment, a rightsizing operation, at a predictive rightsizing controller, is triggered for the VM deployment. The rightsizing operation can include a request to a resource manager for a predicted resource utilization for the VM deployment. The predicted resource utilization can specifically be a predicted maximum resource utilization of the VM deployment. The predicted maximum resource utilization can be, for example, 10% CPU, 50% memory, 20% disk, and 5% network. Based on the predicted resource utilization, a predicted rightsized deployment configuration (e.g., 5 A2s) for the VM deployment is determined. In embodiments, the predicted resource utilization is associated with a confidence score. The confidence score is associated with a confidence score threshold. The confidence score and the confidence score threshold can be used to determine whether to generate or recommend deploying the predicted rightsized deployment configuration of the VM deployment. Also, a customer may choose to opt-in to having the VM deployment automatically modified to a predicted rightsized deployment configuration, while another tenant may simply have the predicted rightsized deployment configuration communicated to them via an interface, such as a recommended predicted rightsized deployment configuration.

Embodiments of the present invention can be described by way of an exemplary customer, components, and systems of a cloud computing system. The customer can initially generate a request to deploy a virtual machine (e.g., via a virtual machine subscription) on one of several nodes of the cloud computing system running several virtual machines. The request can be received through a portal or through any other interface with the cloud computing system that provides for requesting virtual machine deployments. The VM deployment can refer to the one or more virtual machines and the corresponding resources of the VM deployment. The VM deployment can also refer to an electronic representation (e.g., a deployment configuration or deployment configuration file or template) of one or more virtual machines and corresponding resources of the VM deployment.

A virtual machine deployment may be associated with a subscription. A subscription can generally refer to a set of identified resources or selected offerings (e.g., virtual machine deployment instance) from a cloud computing system. A subscription can be associated with a subscription identifier (ID) that identifies the subscription to be implemented. A virtual machine deployment can include resource types that correspond to the subscription. Resource types (e.g., CPU, GPU, RAM, Total Storage MB, NIC_Ghz, VMs, and HDD TOPS) can be predefined or selectively configured by the customer. For example, a virtual machine deployment having 10 A4s, where an A4 is a type of virtual machine, would have a deployment configuration having the specific resources corresponding to implementing the 10 A4s.

A cloud computing system provider may support VMs (e.g., a VM deployment) that are deployed on a node or host. For example, a host can support a first VM deployment for five Small VMs or another VM deployment for three Small VMs and two medium VMs, or yet another VM deployment for one GPU Large VM and two Small VMs, etc. each with additional resource types from the exemplary list of resource types identified above.

Customers may make VM deployment size selections that do not efficiently correspond to the usage. In particular, a customer may select a VM deployment size that under-utilizes the resources associated with the VM deployment. Ideally, a selected VM deployment size should correspond to an expected maximum resource utilization. Cloud computing systems may implement a resource management system (e.g., a resource manager) to rightsize VM deployment configurations.

Embodiments described herein operate based on a prediction engine, of a resource manager, which can make predictions of resource utilization. The prediction engine can make average and maximum resource utilization predictions for selected resources. For example, a deployment configuration can include a CPU utilization metric and the prediction engine can generate a predicted maximum CPU utilization metric, using techniques described herein. In this regard, the prediction engine can generate a predicted resource utilization for a plurality of resources of a subscription.

VM rightsizing in the predictive rightsizing system can be based on the capacity for the prediction engine to make predictions based on VM deployments. The resource engine uses a subscription ID and resource types associated with a VM deployment to make predictions for resource utilization. The subscription ID and selected features are used as input into a predictive model. Resource utilization predictions can be based on a predictive model that uses historical operations or past behaviors of previous VM deployments. The resource utilization prediction model can be a machine learning model that is based on features and learning techniques to generate resource utilization predictions. The prediction engine can use data mining and machine learning techniques to identify correlations that can be leveraged in predictive VM rightsizing.

The prediction engine can leverage multiple techniques and algorithms to produce a prediction, in particular, a maximum resource utilization prediction. For example, the prediction engine can use regression trees to produce resource utilization predictions, the machine can also use Fast Fourier Transforms on the CPU utilization times series to infer whether a VM role is likely to be user-facing. Other variations and combinations of techniques and algorithms for making resource utilization predictions and other types of predictions are contemplated with embodiments of the present disclosure.

The prediction engine can receive a large set of customer, tenant, allocation and usage features as input for learning purposes. In particular, previous VM deployments features and past behaviors can be used to predict a maximum utilization of resource for a new VM deployment. Features can include, but not limited to, a lifetime of the VMs (i.e., length of time the VMs are active in the system), service type, operating system, VM stock keeping unit (SKU), number of cores, virtual machine type, last deployed, and VM memory. After an online training period of the predictive model in the predictive engine, a predictive rightsizing controller can query the predictive engine based on a VM deployment having a set of features to receive a predicted resource utilization.

The predictive rightsizing system can include other aspects (e.g., bucketizing, feature scores and confidence scores) as part of the framework for providing predicted rightsized deployment configurations. With reference to bucketizing, the predictive model can implement bucketizing as part of the model. By way of example, a categorical variable or feature—CPU utilization metric (e.g., 53%)—indicating a VM's past behavior, can be identified. However, the CPU utilization metric at 53% is a narrow indicator of CPU utilization. As such, the CPU utilization metric can be subdivided, or bucketized, into different groups or buckets (e.g., 0-25%, 25-50%, 50%-75%, 75%-100%) collapsing sparsely populated individual CPU utilization metric indicators.

Figure 2A:
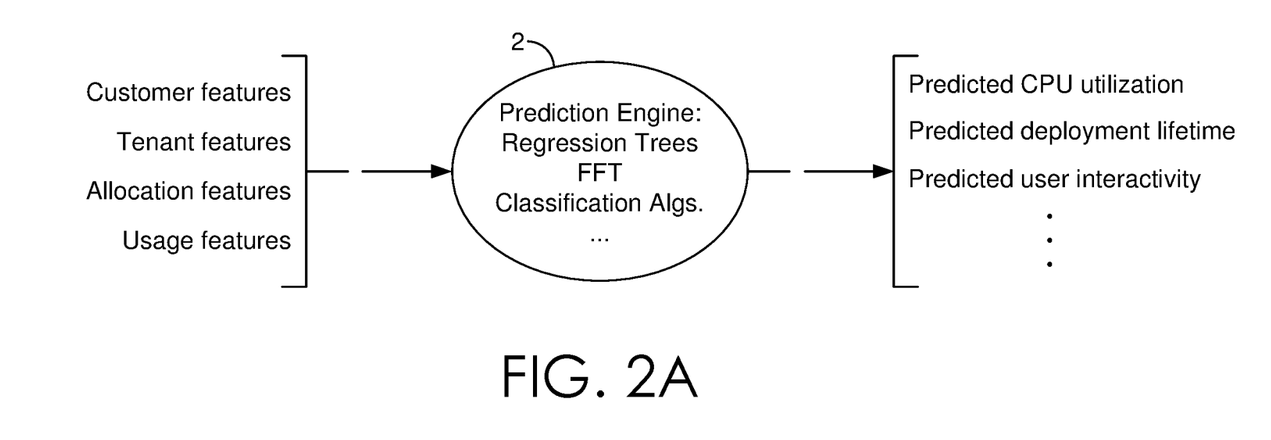
FIG. 2A is a simplified schematic of an example of the prediction engine of the resource management system of FIG. 1.
Figure 2B:
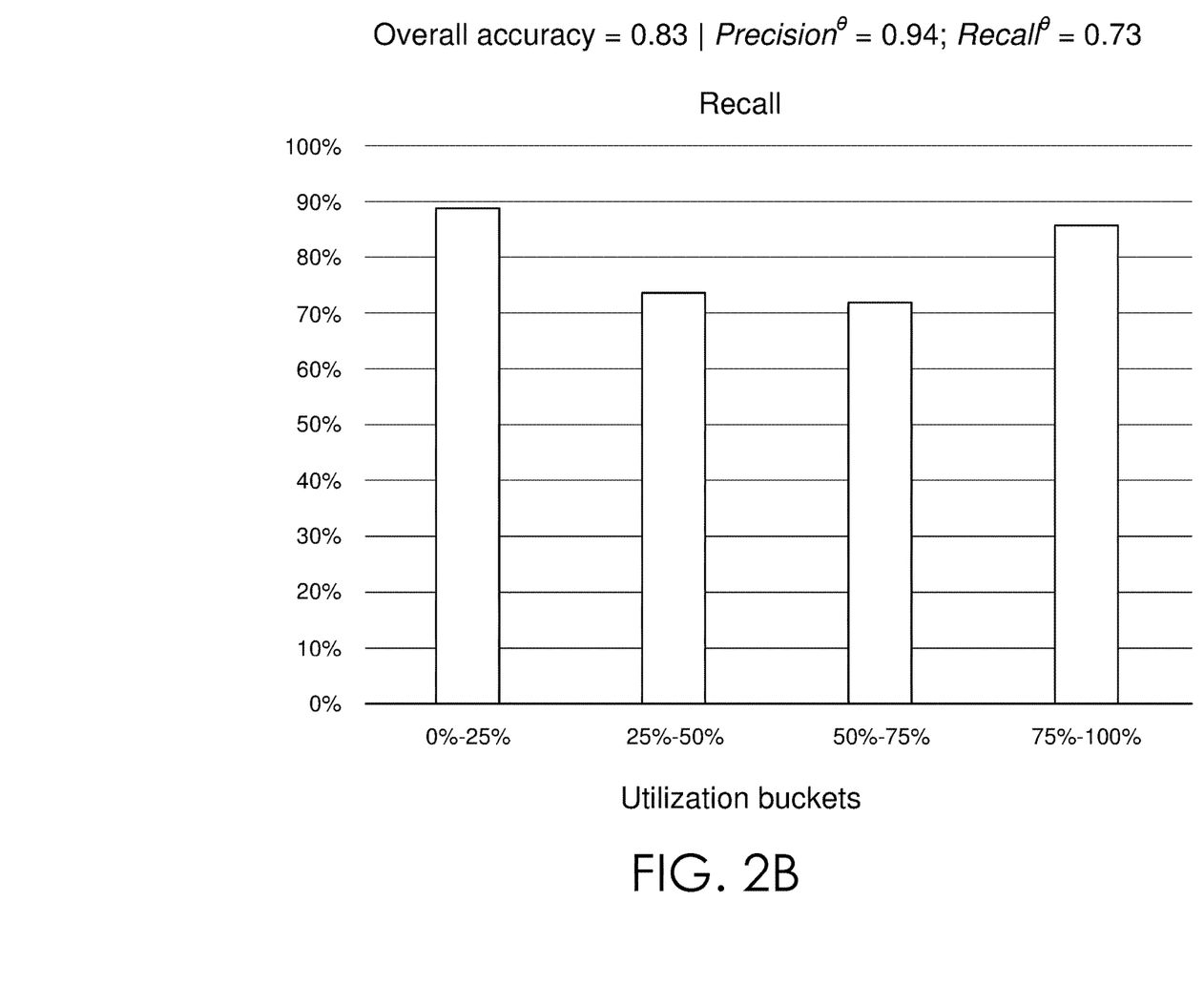
FIG. 2B is a simplified schematic of an example bucketizing chart for the resource management system of FIG. 1.

As shown in FIG. 2B, FIG. 2B plots recall for each bucket independently. The y-axis percentage represents the percentage of VM CPU utilizations in each range—x-axis (i.e., 0-25%, 25-50%, 50%-75%, 75%-100%)—that has been predicted correctly. The VMs have been grouped into 4 VM buckets, each having at or around the indicated percentage of recall for VMs (i.e., VM0 (89%), VM1 (73%), VM2 (71%), and VM3 (86%)) for their corresponding CPU usage buckets (e.g., 0-25%, 25-50%, 50%-75%, 75%-100%). For example, out of all VMs that show CPU utilization between 0-25%, the system predicted 89% correctly as being in the correct bucket, while 11% were predicted as being in other buckets. As mentioned, for a selected feature (e.g., CPU utilization) it can be difficult to predict an exact percentage of utilization of the resource (e.g., 53%) compared to a predefined range (e.g., 50%-75%). In this regard, the predictive model only has to make a prediction for a selected resource type within a particular range. As such, resource utilization prediction is based on bucketizing a VM's resource behaviors into selected ranges.

Figure 2C:
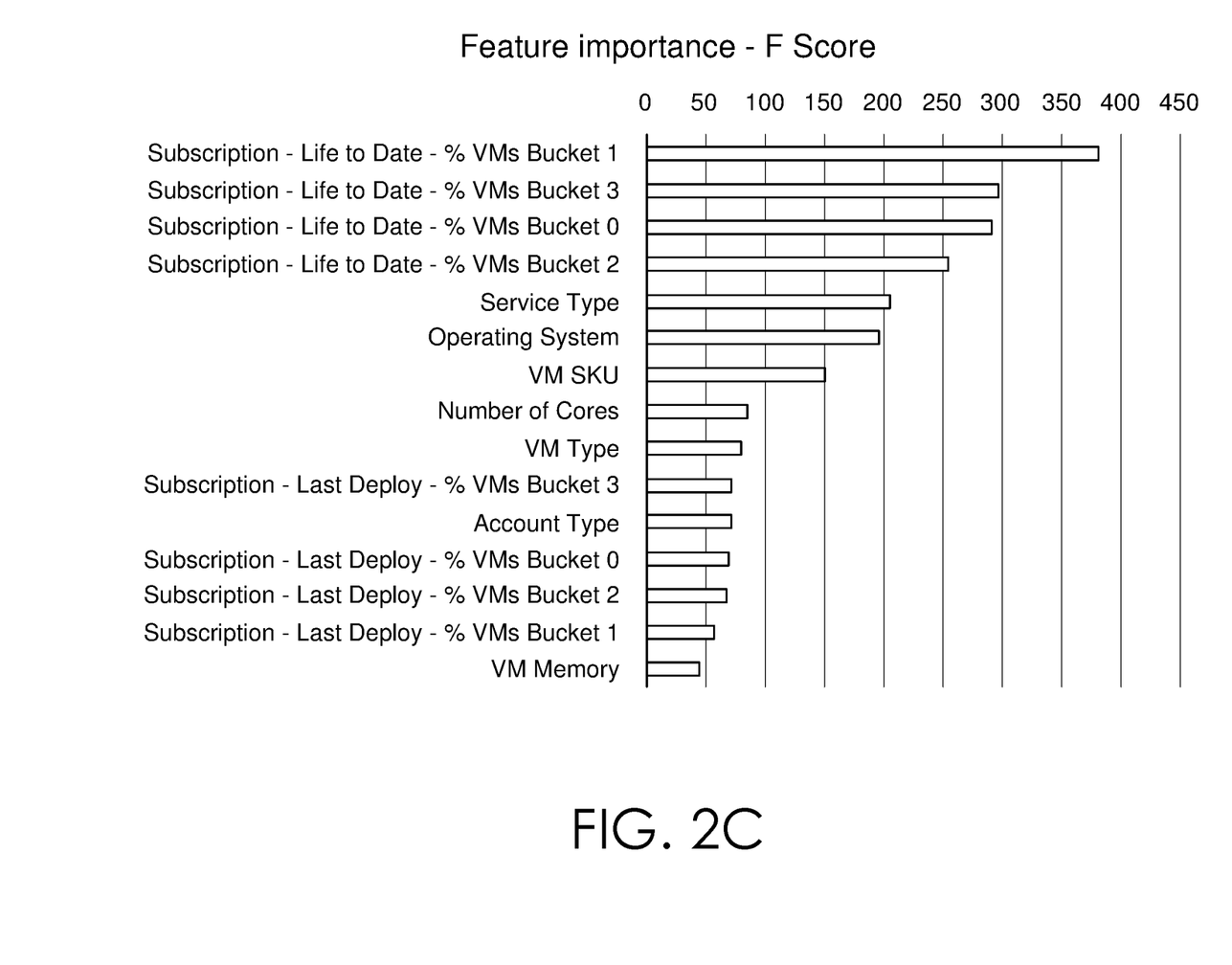
FIG. 2C is a simplified schematic of an example of feature score chart of the resource management system of FIG. 1.

Turning to feature scores, a feature score is an indicator of the importance of a particular feature in generating a predicted resource utilization. In other words, a feature refers to a processing element determined by the machine learning model to be relevant in making an accurate prediction. For example, as shown in FIG. 2C, in this scenario, the percentage of VMs of the same subscription classified into bucket 1 to date, is the most important feature for making a resource utilization prediction, while VM memory feature is the least important feature in making the resource utilization prediction.

With reference to the confidence score for each prediction, like with any other prediction system, prediction errors are possible. The confidence score can be generated based on a precision score and a recall score. The precision score is based on the fraction of correct bucket predictions made in the full set of predictions, and the recall is the fraction of correct bucket predictions made in the space of all elements of the correct bucket. With reference to FIG. 2B, the precision score is 0.94 and recall score 0.73, assuming that any predictions with a confidence score lower than 0.6 are discarded. When no predictions are discarded, overall prediction accuracy is 0.83 or 83%.

As such, a confidence score threshold (e.g., 75%) can be defined such that a predicted rightsized deployment configuration is generated or not generated based on whether the desired confidence is met or not met. By way of example, for low confidence scores (e.g., scores <75%), the predictive rightsizing controller can be configured not to generate a predictive rightsized deployment configuration and thus not make a recommendation to the customer for their VM deployment. While for a high precision score (e.g., score >75), the predictive rightsizing controller can be configured to generate a predictive rightsized deployment configuration and then make a recommendation to the customer for their VM deployment. It is contemplated that the confidence score threshold is selectively configurable based on a plurality of factors associated with the cloud computing system. For example, a customer may have a service level agreement where they opt-in to automatic predicted rightsized deployments for confidence scores above a threshold, or the cloud computing system provider may select or modify the confidence score threshold based on observed outcomes of the prediction engine. Other variations and combinations of confidence scores and threshold and action taken based on them are contemplated with embodiments described herein.

Advantageously, the prediction engine uses specifically identified features of VM deployments and corresponding past behaviors for previous VM deployments to make instantaneous rightsized VM recommendations for a new VM deployment without having to evaluate the new VM deployment for a period of time. The rightsized VM deployment configuration recommendation can also be selectively deployed depending on customer elections. The prediction engine also operates to generate a predicted resource utilization for one or a combination of resources, where the predicted resource utilization can be a predicted maximum resource utilization for the VM deployment. Several techniques (e.g., machine learning, bucketing, feature scores, and confidence scores) can be part of the framework for generating and implementing the predicted resource utilization for rightsizing VMs. Moreover, the predicted rightsized deployment for a VM deployment ultimately improves the operation of several hosts or nodes running the VMs, in that, underlying hardware resources are efficiently used and the overall technology field of rightsizing systems is improved as customers, and cloud computing system providers, benefit from rightsized VMs.

Figure 1:
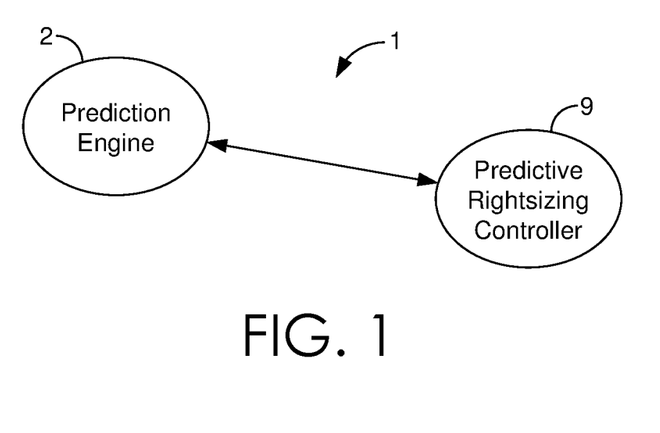
FIG. 1 is a simplified schematic of an example of a resource management system including a prediction engine and a virtual machine allocator for a cloud computing system.

FIG. 1 shows a resource management system 1 including a predictive rightsizing controller 9. FIG. 2A illustrates the prediction engine 2 of the resource management system 1 with its input features, learning techniques, and output predictions. The prediction engine 2 can use data mining and machine learning techniques to identify correlations that can be leveraged in resource management. For example, the prediction engine 2 can receive a large set of customer, tenant, allocation, and usage features as inputs for learning purposes. Examples of these features include customer name, customer type (e.g., internal, external), deployment type (PaaS vs IaaS), time of deployment, number of VMs, VM roles, VM IDs, VM resource utilizations, and times of shutdown.

Figure 2D:
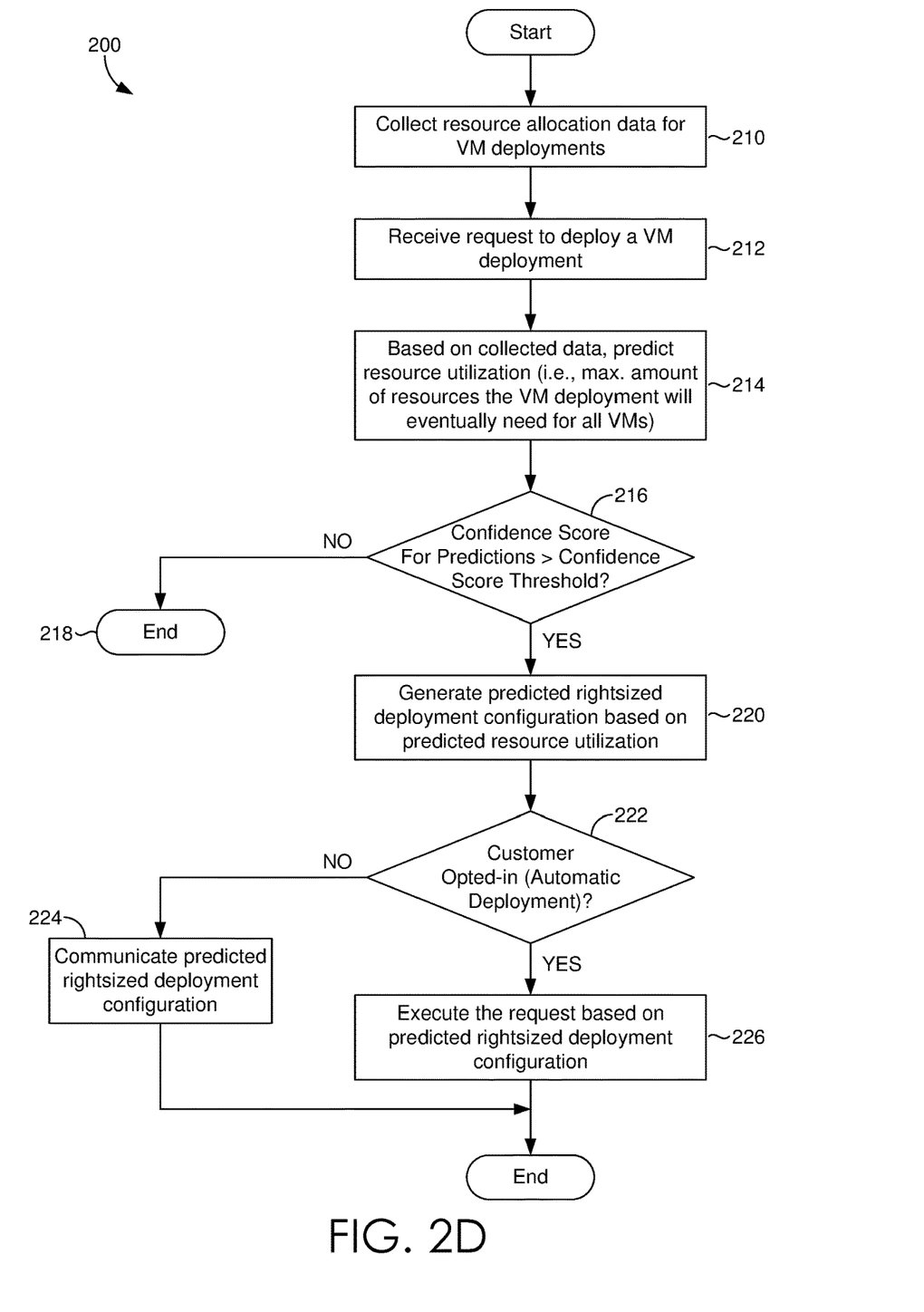
FIG. 2D is a flow diagram showing an exemplary method for implementing a predictive rightsizing system, in accordance with embodiments described herein.

With reference to FIG. 2D, a flow diagram is provided illustrating a method for implementing a predictive rightsizing system. The methods can be performed using the predictive rightsizing system described herein. In embodiments, one or more computer storage media having computer-executable instructions embodied thereon that, when executed, by one or more processors, can cause the one or more processors to perform the methods in the predictive rightsizing system.

In particular, FIG. 2D is a flow diagram that illustrates a method 200 for implementing a predictive rightsizing system. At 210, the resource manager collects data for VM deployments in a cloud computing system. At 212, the predictive rightsizing controller receives a virtual machine deployment associated with a request to deploy a virtual machine on a node from a plurality of nodes running a plurality of virtual machines in the cloud computing system. At 214, based on collected data, the prediction engine generates a predicted resource utilization for the virtual machine deployment. The predicted resource utilization is generated using the prediction engine that uses past behaviors and a plurality of features associated with previous VM deployments to make resource utilization predictions. Predicted resource utilizations are associated with corresponding confidence scores such that predicted rightsized deployments are generated when a confidence score threshold is met;

At 216, determine whether a confidence score for the predicted resource utilization meets a confidence score threshold. At 218, end, to not generate or recommend a predicted rightsized deployment configuration when the confidence score does not meet the confidence score threshold. At 220, based on the predicted resource utilization and the confidence score meeting the confidence score threshold, the predictive rightsizing controller generates a predicted rightsized deployment configuration for the VM deployment. At 222, determine whether a customer has opted-in to automatically executing the request to deploy the VM deployment based on the predicted rightsized deployment configuration. At 224, communicate the predicted rightsized deployment configuration to an interface for the customer, when the customer has not opted-in to automatically executing the request to deploy the VM deployment based on the predicted rightsized deployment configuration. At 426, execute the request based on the predicted rightsized deployment configuration when the customer has opted-in to automatically executing the request to deploy the VM deployment based on the predicted rightsized deployment configuration.

Examples of a cloud computing system, a cluster, healing and growth buffers, and types of VMs are described with reference to FIGS. 3-7.

Figure 3:
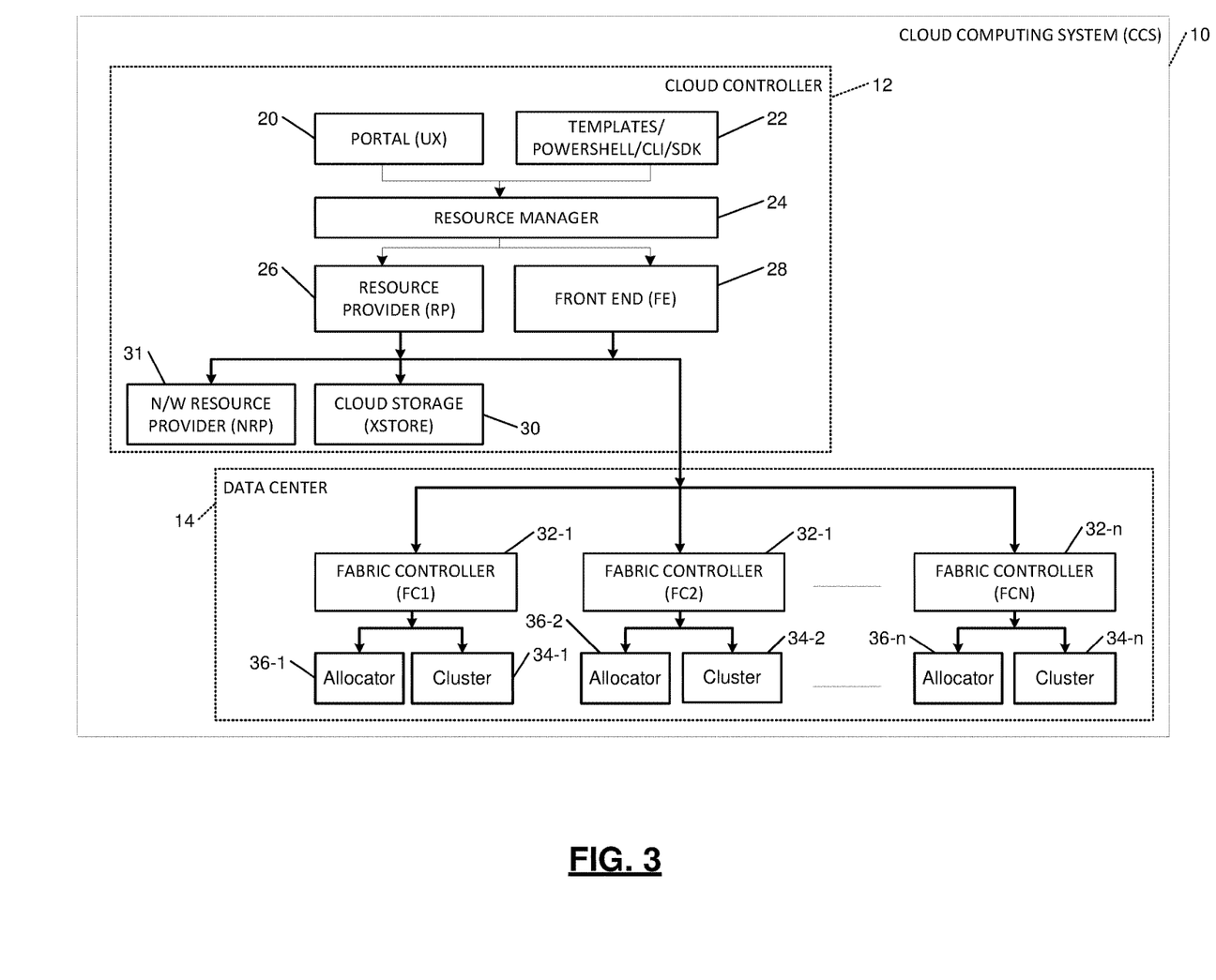
FIG. 3 is a functional block diagram of a simplified example of a cloud computing system that utilizes the resource management system of FIG. 1 to deploy virtual machines.

FIG. 3 shows a simplistic example of a cloud computing system (CCS) 10 according to the present disclosure. The cloud computing system 10 includes a cloud controller 12 and at least one data center 14. While only one data center 14 is shown for simplicity, the cloud controller 12 can interface with a plurality of data centers. Further, while the data center 14 is shown as being local to the cloud controller 12, one or more data centers may be geographically remote from the cloud controller 12, may be located in different geographic locations (e.g., in different time zones, different countries or continents, and so on), and may communicate with the cloud controller 12 via various networks.

Each data center 14 includes a plurality of fabric controllers 32-1, 32-2, . . . , 32-n (collectively fabric controllers 32) and corresponding clusters 34-1, 34-2, . . . , 34-n (collectively clusters 34). Each fabric controller 32 controls a respective cluster 34. Each cluster 34 includes a plurality of racks (shown in FIGS. 4-5), and each rack includes a plurality of nodes (shown in FIG. 5), which are also called servers, hosts, or machines throughout the present disclosure. Each fabric controller 32 is associated with an allocator 36 that allocates resources within the cluster 34 for instances of customer services hosted on the cluster 34.

The cloud controller 12 includes a portal 20 and a software development kit (SDK) 22 that the customers can use to select resources and request service deployment. The cloud controller 12 further includes a cloud resource manager 24, a compute resource provider 26, and a front-end 28. The front-end 28 interfaces with the fabric controllers 32. The cloud resource manager 24 receives the customer selections and forwards the customer selections to the compute resource provider 26. The compute resource provider 26 generates a tenant model based on the customer selections. The compute resource provider 26 provisions resources to the customer services according to the tenant model generated based on the customer selections. The compute resource provider 26 provisions storage, networking, and computing resources by interfacing with a cloud storage (Xstore) 30, a network resource provider 31, and the fabric controllers 32. The compute resource provider 26 and the fabric controllers 32 can at least partially implement the resource management system 1 shown in FIGS. 1-2.

Figure 4:
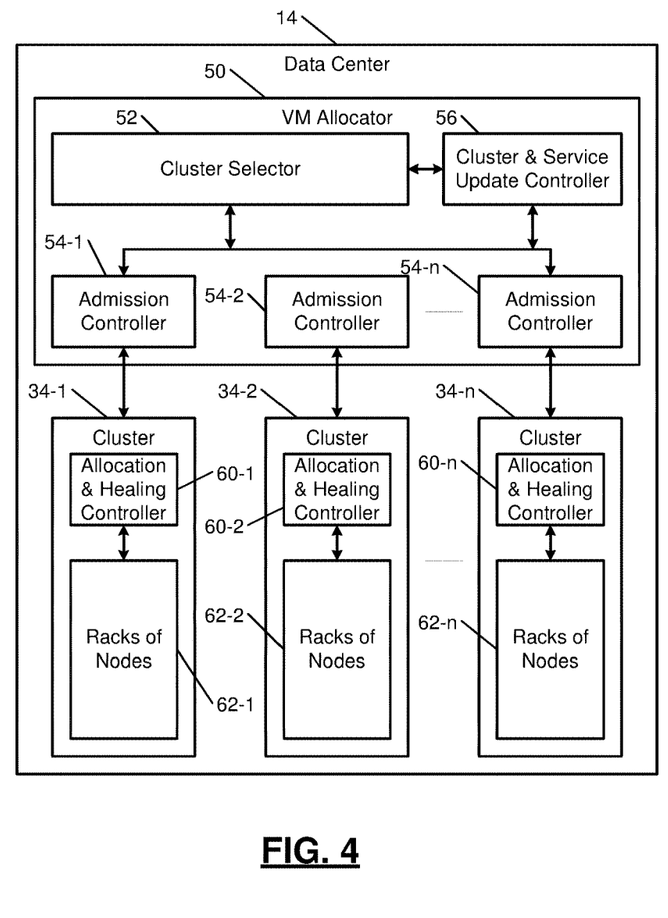
FIG. 4 is a functional block diagram of a simplified example of a data center shown in FIG. 3 that utilizes the resource management system of FIG. 1 to deploy virtual machines.

FIG. 4 shows a simplistic example of a data center (e.g., the data center 14 shown in FIG. 3). The data center 14 includes a VM allocator 50 and the clusters 34. The VM allocator 50 can implement the VM allocator 4 of FIG. 1. The VM allocator 50 includes a cluster selector 52 and a plurality of admission controllers 54-1, 54-2, . . . , 54-$n$ (collectively admission controllers 54). Each admission controller 54 is associated with a corresponding cluster 34. Each cluster 34 includes an allocation and healing controller 60 (shown as allocation and healing controllers 60-1, 60-2, . . . , and 60-$n$; one allocation and healing controller per cluster) and one or more racks 62 of nodes (also called servers, hosts, or machines; and shown as racks 62-1, 62-2, . . . , 62-$n$). The allocation and healing controller 60 can implement the VM allocator 36 of FIG. 3.

Allocating a VM can be a multilevel allocation operation. The VM allocator 50 first selects one of the clusters 34 in which to allocate a VM in association with the corresponding admission controller 54. After the VM allocator 50 selects one of the clusters 34 to allocate the VM, the allocation and healing controller 60 of the selected cluster 34 places the VM on one or more of the nodes in one or more of the racks 62 in the selected cluster 34 depending on the number of update and fault domains and other resources specified by the customer and based on the predictions provided by the prediction engine 2.

Based on VM activity in the clusters 34, a cluster and service update controller 56 provides updates to the cluster selector 52 and the resource management system 1, which can be partly implemented by the VM allocator 50 and the allocation and healing controllers 60. For example, the VM activity may include activation and termination of one or more VM's in the clusters 34. The cluster and service update controller 56 may also provide updates to the cluster selector 52 and the resource management system 1 regarding utilization of growth buffers due to service scale out and utilization of healing buffers due to node/rack failures, which are explained below with reference to FIG. 6.

Figure 5:
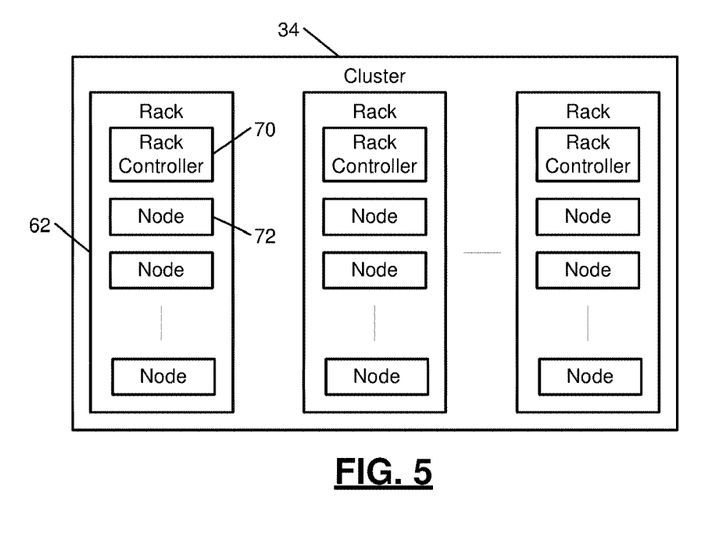
FIG. 5 is a functional block diagram of a simplified example of a cluster shown in FIG. 3.

FIG. 5 shows an example of a cluster (e.g., the cluster 34 shown in FIGS. 3-4). Each cluster 34 includes the plurality of racks 62. Each rack 62 includes a rack controller 70 and a plurality of nodes 72. Each rack controller 70 includes a power controller (not shown) that controls power allocation to the plurality of nodes 72 in the rack 62.

Figure 6:
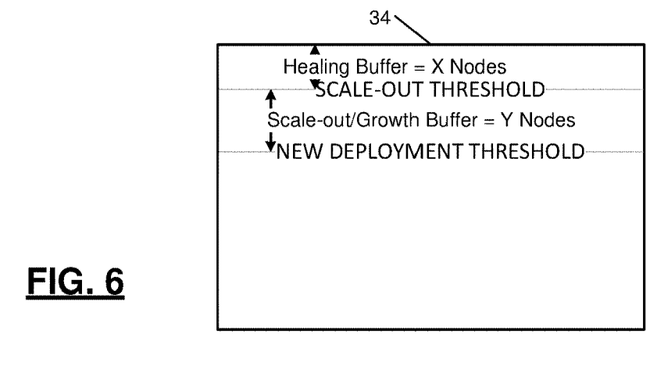
FIG. 6 shows a simplified example of a healing buffer and a scale-out/growth buffer in a cluster.

FIG. 6 shows an example of a scale out/growth buffer and a healing buffer in a cluster (e.g., the cluster 34 shown in FIGS. 3-5). Each of the scale out/growth buffer and the healing buffer can comprise a plurality of the nodes 72 within the cluster 34. If a node 72 or a rack 62 fails in the cluster 34, the VM's running on the failed component are healed using the plurality of nodes in the healing buffer. If a service needs to scale out (i.e., expand beyond the allocated resources, which requires additional resources than the allocated resources), extra VM's are placed within the cluster 34. To address one or both of these situations (healing and/or scale-out), sufficient nodes are allocated to the respective buffers.

When the new deployment threshold is reached in the cluster 34, no new VM deployments can occur into the cluster 34. When the scale out threshold is reached in the cluster 34, the existing tenants cannot grow anymore in the cluster 34. Any attempt to grow results in a scale out failure. If the healing buffer is exhausted in the cluster 34, any node/rack failures cannot be healed, and a healing failure occurs. Setting the thresholds determines the size of the buffers (e.g., too small, too large, or balanced). The thresholds can be optimized and failures can be minimized based on the predictions from the resource management system 1.

Figure 7:
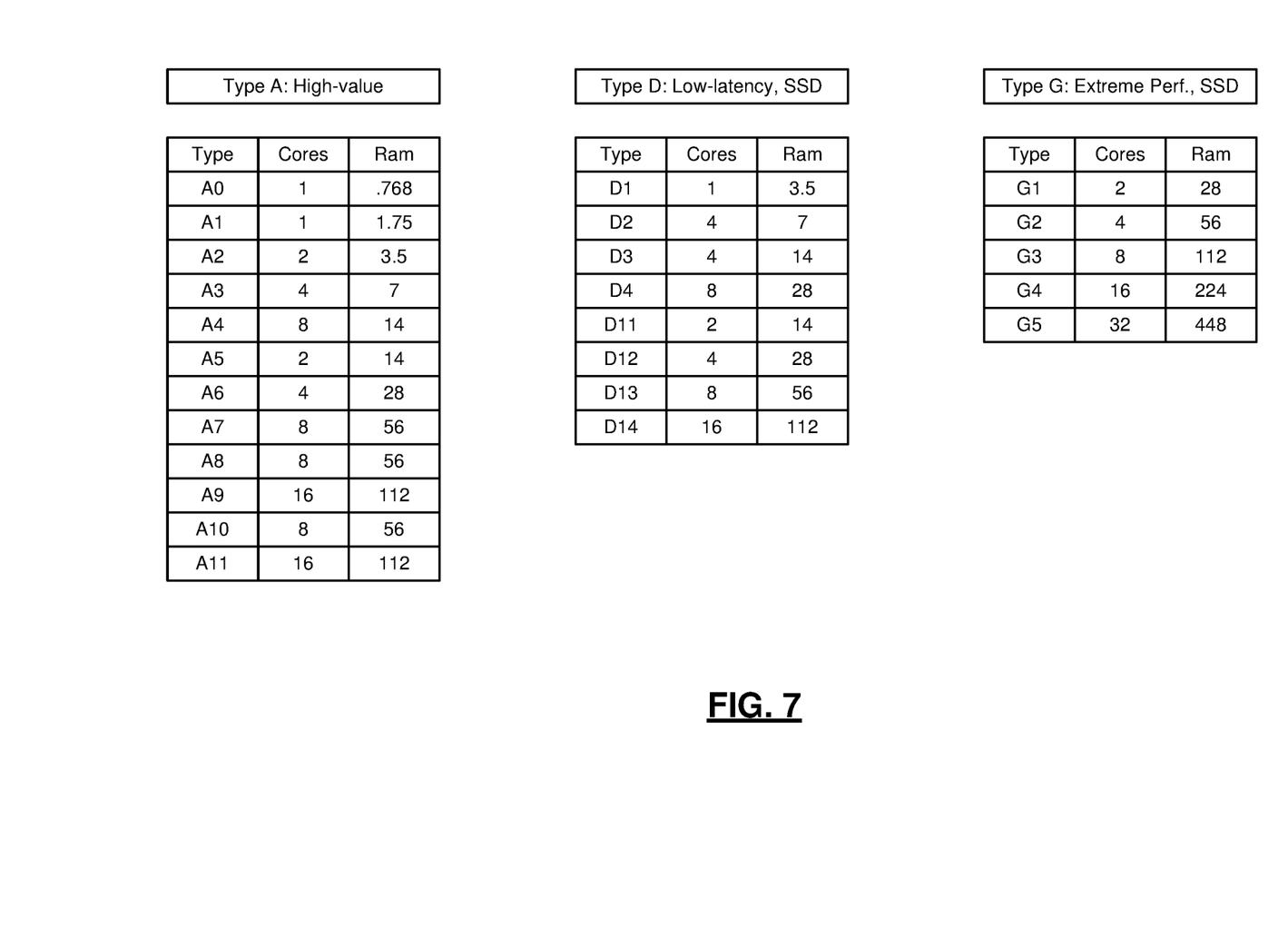
FIG. 7 shows examples of different types of virtual machines.

FIG. 7 shows examples of different types of VMs depending on their resource requirements. These are only examples, and additional types of VM categories are contemplated. Due to the different resource requirements, the type or category of a VM is an important consideration in the allocation decision. For example, the resource management system 1 can collect and analyze data for many types of VMs. Based on the data, the resource management system 1 can use information regarding the type of a VM that is to be deployed and predict whether the VM will be user-facing or non-user-facing, the lifetime of the VM, and so on.

Accordingly, the resource management system 1, when implemented by the cloud computing system 10, can provide predicted rightsized deployment configurations using a predictive rightsizing system. In particular, predicted rightsized deployment configurations are generated for virtual machine "VM" subscriptions having deployment configurations that are modified to predicted rightsized deployment configurations based on a prediction engine of a resource manager. The prediction engine may use a machine learning model based on past behaviors and features associated with previous VM deployments to make resource utilization predictions (e.g., maximum resource utilization predictions) for VM deployments.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

In a first independent embodiment, a predictive rightsizing system for rightsizing virtual machines is provided, the system comprising: a processor and memory; and machine readable instructions stored in the memory, when executed by the processor, configure the processor to: access a virtual machine deployment associated with a request to deploy a virtual machine on a node from a plurality of nodes running a plurality of virtual machines in a cloud computing system; access a predicted resource utilization for the virtual machine deployment, wherein the predicted resource utilization is generated based on a prediction engine that uses past behaviors and a plurality of features associated with previous virtual machine deployments to make resource utilization predictions; based on the predicted resource utilization, generate a predicted rightsized deployment configuration for the virtual machine deployment; and communicate the predicted rightsized deployment configuration such that the request to deploy the virtual machine is executed based on the predicted rightsized deployment configuration.

In another embodiment, the predicted resource utilization is a predicted maximum resource utilization for the virtual machine deployment, where the predicted resource utilization is associated with one or more resource types. The virtual machine deployment comprises a deployment configuration comprising the virtual machine and one or more resource types.

In another embodiment, the plurality of features are associated with previous virtual machine deployments in the cloud computing system, where based on the plurality features, the past behaviors for the previous virtual machine deployments are used generate the predicted resource utilization.

In another embodiment, generating the predicted rightsized deployment configuration for the virtual machine deployment is based on the predicted resource utilization to circumvent a monitoring period for monitoring virtual machine deployments prior to generating a recommended rightsized deployment.

In another embodiment, generating the predicted rightsized deployment configuration further comprises: based on the predicted resource utilization, modifying one or more resources in a deployment configuration of the virtual machine deployment.

In another embodiment, the request is associated with a customer of the cloud computing system, wherein the customer has opted-in to automatically executing the request based on the predicted rightsized deployment configuration.

In another embodiment, the predicted resource utilizations are associated with corresponding confidence scores such that predicted rightsized deployment configurations are generated when a confidence score threshold is met.

In a second independent embodiment, one or more computer storage media having computer-executable instructions embodied thereon that, when executed, by one or more processors, cause the one or more processors to perform a method for rightsizing virtual machines, the method comprises accessing a virtual machine deployment associated with a request to deploy a virtual machine on a node from a plurality of nodes running a plurality of virtual machines in a cloud computing system; accessing a predicted resource utilization for the virtual machine deployment, wherein the predicted resource utilization is generated based on a prediction engine that uses past behaviors and a plurality of features associated with previous virtual machine deployments to make resource utilization predictions, wherein predicted resource utilizations are associated with corresponding confidence scores such that predicted rightsized deployment configurations are generated when a confidence score threshold is met; based on the predicted resource utilization and a confidence score meeting the confidence score threshold, generating a predicted rightsized deployment configuration for the virtual machine deployment; and communicating the predicted rightsized deployment configuration such that the request to deploy the virtual machine is executed based on the predicted rightsized deployment configuration.

In another embodiment, the predicted resource utilization is a predicted maximum resource utilization for the virtual machine deployment, the predicted resource utilization is associated with one or more resource types, the virtual machine deployment comprises a deployment configuration comprising the virtual machine and one or more resource types.

In another embodiment, the plurality of features are associated with previous virtual machine deployments in the cloud computing system, where, based on the plurality features, the past behaviors for the previous virtual machine deployments are used generate the predicted resource utilization.

In another embodiment, generating the predicted rightsized deployment configuration for the virtual machine deployment is based on the predicted resource utilization to circumvent a monitoring period for monitoring virtual machine deployments prior to generating a recommended rightsized deployment.

In another embodiment, generating the predicted rightsized deployment configuration further comprises: based on the predicted resource utilization modifying one or more resources in a deployment configuration of the virtual machine deployment.

In another embodiment, the request is associated with a customer of the cloud computing system, where the customer has opted-in to automatically executing the request based on the predicted rightsized deployment configuration.

In another embodiment, the confidence score threshold is selectively configured based a plurality of factors associated with the cloud computing system.

In a third independent embodiment, a method for rightsizing virtual machines is provided, the method comprising: accessing a virtual machine deployment associated with a request to deploy a virtual machine on a node; accessing a predicted resource utilization for the virtual machine deployment, where the predicted resource utilization is generated based on a prediction engine that uses past behaviors and a plurality of features associated with previous virtual machine deployments make resource utilization predictions; based on the predicted resource utilization, generating a predicted rightsized deployment configuration for the virtual machine deployment; and processing the predicted rightsized deployment configuration.

In another embodiment, the predicted resource utilization is a predicted maximum resource utilization for the virtual machine deployment, wherein the predicted resource utilization is associated with one or more resource types, wherein the virtual machine deployment comprises a deployment configuration comprising the virtual machine and one or more resource types.

In another embodiment, the plurality of features are associated with previous virtual machine deployments in the cloud computing system; wherein, based on the plurality features, the past behaviors for the previous virtual machine deployments are used generate the predicted resource utilization.

In another embodiment, generating the predicted rightsized deployment configuration for the virtual machine deployment is based on the predicted resource utilization to circumvent a monitoring period for monitoring virtual machine deployments prior to generating a recommended rightsized deployment.

In another embodiment, the predicted resource utilizations are associated with corresponding confidence scores such that predicted rightsized deployment configurations are generated when a confidence score threshold is met.

In another embodiment, processing the predicted rightsized deployment configuration comprises performing one of the following: causing the request to deploy the virtual machine to be executed based on the predicted rightsized deployment configuration; and communicating the predicted rightsized deployment configuration to an interface.

Figure 8:
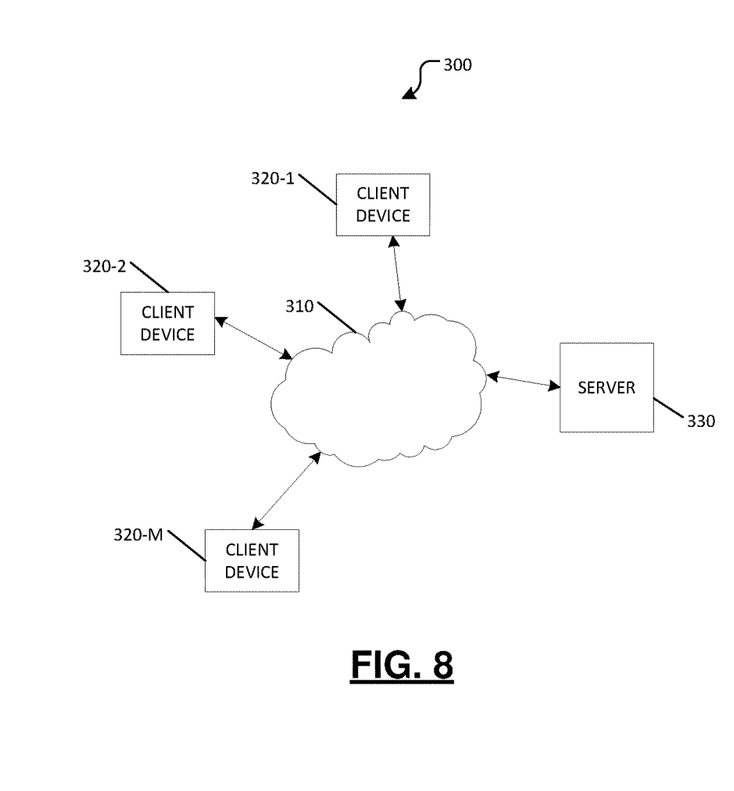
FIG. 8 is a functional block diagram of a simplified example of a distributed network system.

FIG. 8 shows a simplified example of a distributed network system 100. The distributed network system 300 includes a network 310, one or more client devices 320-1, 320-2, . . . , and 320-N (collectively client devices 320) (where N is an integer greater than or equal to one), and a server 330. The network 310 may include a local area network (LAN), a wide area network (WAN) such as the Internet, or other type of network (collectively shown as the network 310). While only one server is shown, the distributed network system 300 may include multiple servers. The client devices 320 communicate with the server 330 via the network 310. The client devices 320 and the server 330 may connect to the network 310 using wireless and/or wired connections to the network 310.

One or more servers 330 and the client devices 320 may implement one or more components of the cloud computing system 10 shown in FIG. 3. For example, one server 330 may implement the cloud controller 12 or the compute resource provider 26 of the cloud controller 12 while one or more client devices 320 may implement the fabric controllers 32. Alternatively, one or more servers 330 may implement one or more components of the cloud controller 12. Many different configurations of implementations are contemplated.

The server 330 may provide multiple services to the client devices 320. For example, the server 330 may execute a plurality of software applications. The server 330 may host multiple databases that are utilized by the plurality of software applications and that are used by the client devices 320. In addition, the server 330 and the client devices 320 may execute applications that implement one or more components of the resource management system 1 and one or more methods for the use cases described above.

Figure 9:
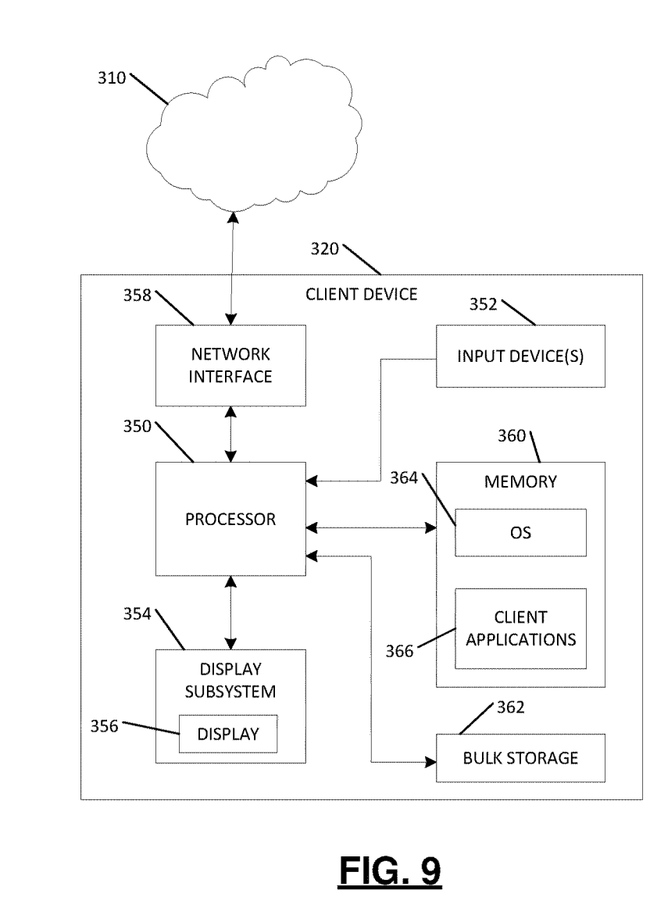
FIG. 9 is a functional block diagram of a simplified example of a client device used in the distributed network system of FIG. 8.

FIG. 9 shows a simplified example of the client device 320. The client device 320 may typically include a central processing unit (CPU) or processor 350, one or more input devices 352 (e.g., a keypad, touchpad, mouse, and so on), a display subsystem 354 including a display 356, a network interface 358, a memory 360, and a bulk storage 362.

The network interface 358 connects the client device 320 to the distributed network system 300 via the network 310. For example, the network interface 358 may include a wired interface (e.g., an Ethernet interface) and/or a wireless interface (e.g., a Wi-Fi, Bluetooth, near field communication (NFC), or other wireless interface). The memory 360 may include volatile or nonvolatile memory, cache, or other type of memory. The bulk storage 362 may include flash memory, a hard disk drive (HDD), or other bulk storage device.

The processor 350 of the client device 320 executes an operating system (OS) 364 and one or more client applications 366. The client applications 366 include an application to connect the client device 320 to the server 330 via the network 310. The client device 320 accesses one or more applications executed by the server 330 via the network 310. The client applications 366 may also include an application that implements all or some aspects of one or more components of the resource management system 1 and one or more methods for the use cases described above.

Figure 10:
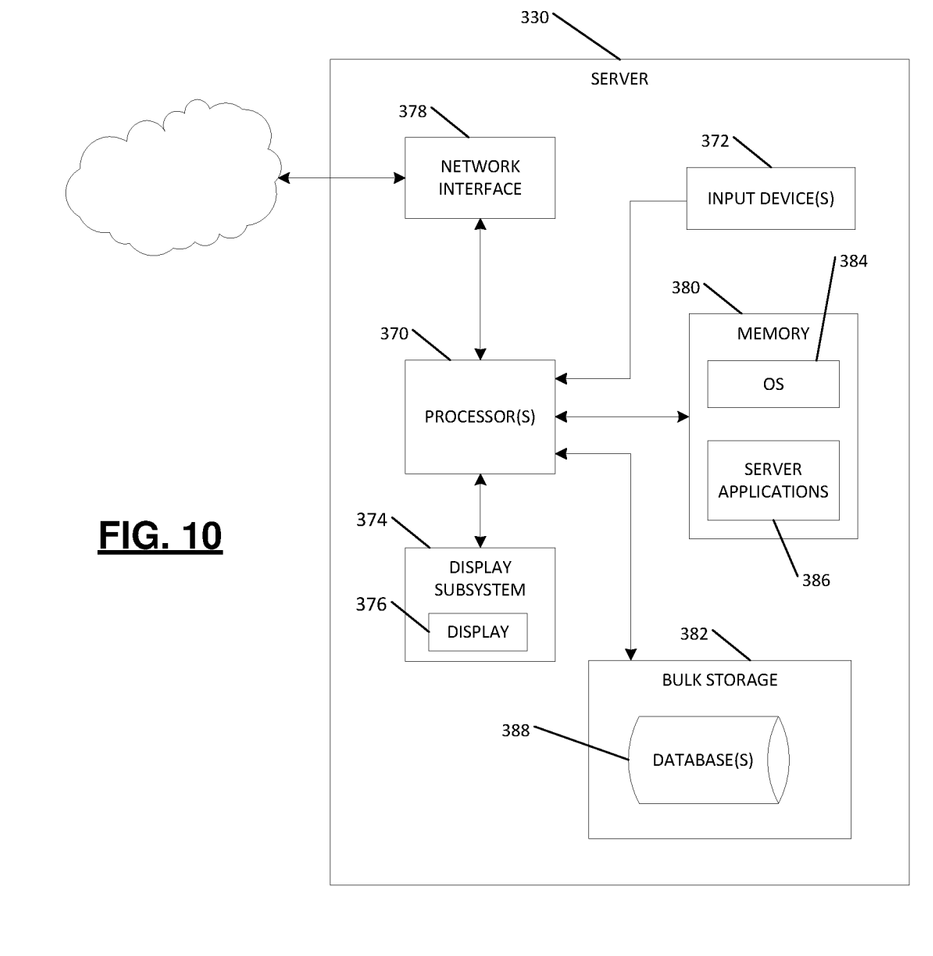
FIG. 10 is a functional block diagram of a simplified example of a server used in the distributed network system of FIG. 8.

FIG. 10 shows a simplified example of the server 330. The server 330 typically includes one or more CPUs or processors 370, one or more input devices 372 (e.g., a keypad, touchpad, mouse, and so on), a display subsystem 374 including a display 376, a network interface 378, a memory 380, and a bulk storage 382.

The network interface 378 connects the server 330 to the distributed network system 300 via the network 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The bulk storage 382 may include flash memory, one or more hard disk drives (HDDs), or other bulk storage device.

The processor 370 of the server 130 executes an operating system (OS) 384 and one or more server applications 386. The server applications 386 may include an application that implements all or some aspects of one or more components of the resource management system 1 and one or more methods for the use cases described above. The bulk storage 382 may store one or more databases 388 that store data structures used by the server applications 386 to perform respective functions.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium or machine-readable medium. The term computer-readable medium or machine-readable medium, as used herein, does not encompass transitory electrical or electromagnetic signals propagating through a medium (such as on a carrier wave); the term computer-readable medium or machine-readable medium may therefore be considered tangible and non-transitory. Non-limiting examples of a non-transitory, tangible computer-readable medium or machine-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A predictive rightsizing system for rightsizing virtual machines, the system comprising:
   a processor and memory; and
   machine readable instructions stored in the memory, when executed by the processor, configure the processor to:
   access a virtual machine deployment associated with a request to deploy a virtual machine on a node from a plurality of nodes running a plurality of virtual machines in a cloud computing system;
   access a predicted resource utilization for the virtual machine deployment, wherein the predicted resource utilization is generated based on a prediction engine that uses past behaviors and a plurality of features associated with previous virtual machine deployments to make resource utilization predictions, wherein predicted resource utilizations are associated with corresponding confidence scores that are used for selectively generating predicted rightsized deployments, wherein the predicted rightsized deployment configurations are generated when the confidence scores meet a confidence score threshold;
   based on the predicted resource utilization, generate a predicted rightsized deployment configuration for the virtual machine deployment; and
   communicate the predicted rightsized deployment configuration such that the request to deploy the virtual machine is executed based on the predicted rightsized deployment configuration.

2. The system of claim 1, wherein the predicted resource utilization is a predicted maximum resource utilization for the virtual machine deployment, wherein the predicted resource utilization is associated with one or more resource types, wherein the virtual machine deployment comprises a deployment configuration comprising the virtual machine and one or more resource types.

3. The system of claim 1, wherein the plurality of features are associated with previous virtual machine deployments in the cloud computing system; wherein, based on the plurality features, the past behaviors for the previous virtual machine deployments are used generate the predicted resource utilization.

4. The system of claim 1, wherein generating the predicted rightsized deployment configuration for the virtual machine deployment is based on the predicted resource utilization to circumvent a monitoring period for monitoring virtual machine deployments prior to generating a recommended rightsized deployment.

5. The system of claim 1, wherein generating the predicted rightsized deployment configuration further comprises: based on the predicted resource utilization, modifying one or more resources in a deployment configuration of the virtual machine deployment.

6. The system of claim 1, wherein the request is associated with a customer of the cloud computing system, wherein the customer has opted-in to automatically executing the request based on the predicted rightsized deployment configuration.

7. The system of claim 1, wherein the confidence scores and the confidence score thresholds are used to selectively deploy the predicted rightsized deployments, wherein the predicted rightsized deployments are not deployed when the confidence scores do not meet the confidence score thresholds.

8. One or more computer storage media having computer-executable instructions embodied thereon that, when executed, by one or more processors, cause the one or more processors to perform a method for rightsizing virtual machines, the method comprising:
   accessing a virtual machine deployment associated with a request to deploy a virtual machine on a node from a plurality of nodes running a plurality of virtual machines in a cloud computing system;
   accessing a predicted resource utilization for the virtual machine deployment, wherein the predicted resource utilization is generated based on a prediction engine that uses past behaviors and a plurality of features associated with previous virtual machine deployments to make resource utilization predictions, wherein predicted resource utilizations are associated with corresponding confidence scores that are used for selectively generating predicted rightsized deployments, wherein the predicted rightsized deployment configurations are generated when the confidence scores meet a confidence score threshold;

based on the predicted resource utilization and a confidence score meeting the confidence score threshold, generating a predicted rightsized deployment configuration for the virtual machine deployment; and communicating the predicted rightsized deployment configuration such that the request to deploy the virtual machine is executed based on the predicted rightsized deployment configuration.

9. The media of claim 8, wherein the predicted resource utilization is a predicted maximum resource utilization for the virtual machine deployment, wherein the predicted resource utilization is associated with one or more resource types, wherein the virtual machine deployment comprises a deployment configuration comprising the virtual machine and one or more resource types.

10. The media of claim 8, wherein the plurality of features are associated with previous virtual machine deployments in the cloud computing system, wherein, based on the plurality features, the past behaviors for the previous virtual machine deployments are used generate the predicted resource utilization.

11. The media of claim 8, wherein generating the predicted rightsized deployment configuration for the virtual machine deployment is based on the predicted resource utilization to circumvent a monitoring period for monitoring virtual machine deployments prior to generating a recommended rightsized deployment.

12. The media of claim 8, wherein generating the predicted rightsized deployment configuration further comprises: based on the predicted resource utilization modifying one or more resources in a deployment configuration of the virtual machine deployment.

13. The media of claim 8, wherein the request is associated with a customer of the cloud computing system, wherein the customer has opted-in to automatically executing the request based on the predicted rightsized deployment configuration.

14. The media of claim 8, wherein the confidence score threshold is selectively configured based a plurality of factors associated with the cloud computing system.

15. A method for rightsizing virtual machines, the method comprising:

accessing a virtual machine deployment associated with a request to deploy a virtual machine on a node;

accessing a predicted resource utilization for the virtual machine deployment, wherein the predicted resource utilization is generated based on a prediction engine that uses past behaviors and a plurality of features associated with previous virtual machine deployments make resource utilization predictions, wherein predicted resource utilizations are associated with corresponding confidence scores that are used for selectively generating predicted rightsized deployments, wherein the predicted rightsized deployment configurations are generated when the confidence scores meet a confidence score threshold;

based on the predicted resource utilization, generating a predicted rightsized deployment configuration for the virtual machine deployment; and processing the predicted rightsized deployment configuration.

16. The method of claim 15, wherein the predicted resource utilization is a predicted maximum resource utilization for the virtual machine deployment, wherein the predicted resource utilization is associated with one or more resource types, wherein the virtual machine deployment comprises a deployment configuration comprising the virtual machine and one or more resource types.

17. The method of claim 15, wherein the plurality of features are associated with previous virtual machine deployments in the cloud computing system; wherein, based on the plurality features, the past behaviors for the previous virtual machine deployments are used generate the predicted resource utilization.

18. The method of claim 15, wherein generating the predicted rightsized deployment configuration for the virtual machine deployment is based on the predicted resource utilization to circumvent a monitoring period for monitoring virtual machine deployments prior to generating a recommended rightsized deployment.

19. The method of claim 15, wherein the confidence scores and the confidence score thresholds are used to selectively deploy the predicted rightsized deployments, wherein the predicted rightsized deployments are not deployed when the confidence scores do not meet the confidence score thresholds.

20. The method of claim 15, wherein processing the predicted rightsized deployment configuration comprises performing one of the following:

causing the request to deploy the virtual machine to be executed based on the predicted rightsized deployment configuration; and communicating the predicted rightsized deployment configuration to an interface.

* * * * *